United States Patent [19]

Strohbach et al.

[11] 3,959,513

[45] May 25, 1976

[54] METHOD AND SYSTEM FOR PRODUCING A SOFT FOOD PRODUCT

[75] Inventors: John W. Strohbach; Robert M. Williams; Jeffrey D. Edwards; Christopher B. Newcomer, all of Cincinnati, Ohio

[73] Assignee: The Kroger Company, Cincinnati, Ohio

[22] Filed: Nov. 1, 1974

[21] Appl. No.: 520,204

[52] U.S. Cl............................. 426/565; 426/312; 62/74; 62/347; 62/306
[51] Int. Cl.²......................................... A23G 9/20
[58] Field of Search ............... 426/565, 312; 62/74, 62/347, 306

[56] References Cited
UNITED STATES PATENTS

| | | | |
|---|---|---|---|
| 2,594,442 | 4/1952 | Irwin | 62/74 |
| 3,052,557 | 9/1962 | Vidal et al. | 62/347 |
| 3,188,825 | 6/1965 | Olphen | 62/347 |
| 3,313,032 | 4/1967 | Malecki | 62/347 |

*Primary Examiner*—Jeanette M. Hunter
*Attorney, Agent, or Firm*—Cushman, Darby & Cushman

[57] ABSTRACT

A system and method for producing a soft food mix, such as soft ice cream, combined with a gas mixture such as a food grade fluorocarbon and nitrous oxide whereby the mix is injected into a saturation tower as atomized particles. A source of gases above atmospheric pressure is also connected to the tower so that the injected particles mix with the gas and fall to the bottom of the tower where they are removed and coupled to a conventional pressurized container filler. To improve consistency the saturated mix in the bottom of the tower is recirculated by a pump and injected against a barrier near the top to fall again through the pressurized gases. A pump controlled by sensors within the tower is connected between a mix tank and the tower to be controlled by the sensors to maintain a range of saturated mix in the tower with a heat exchanger removing any heat so added. A valve is disposed between the filler and tower and controlled by a further sensor to prevent draining the tower.

26 Claims, 1 Drawing Figure

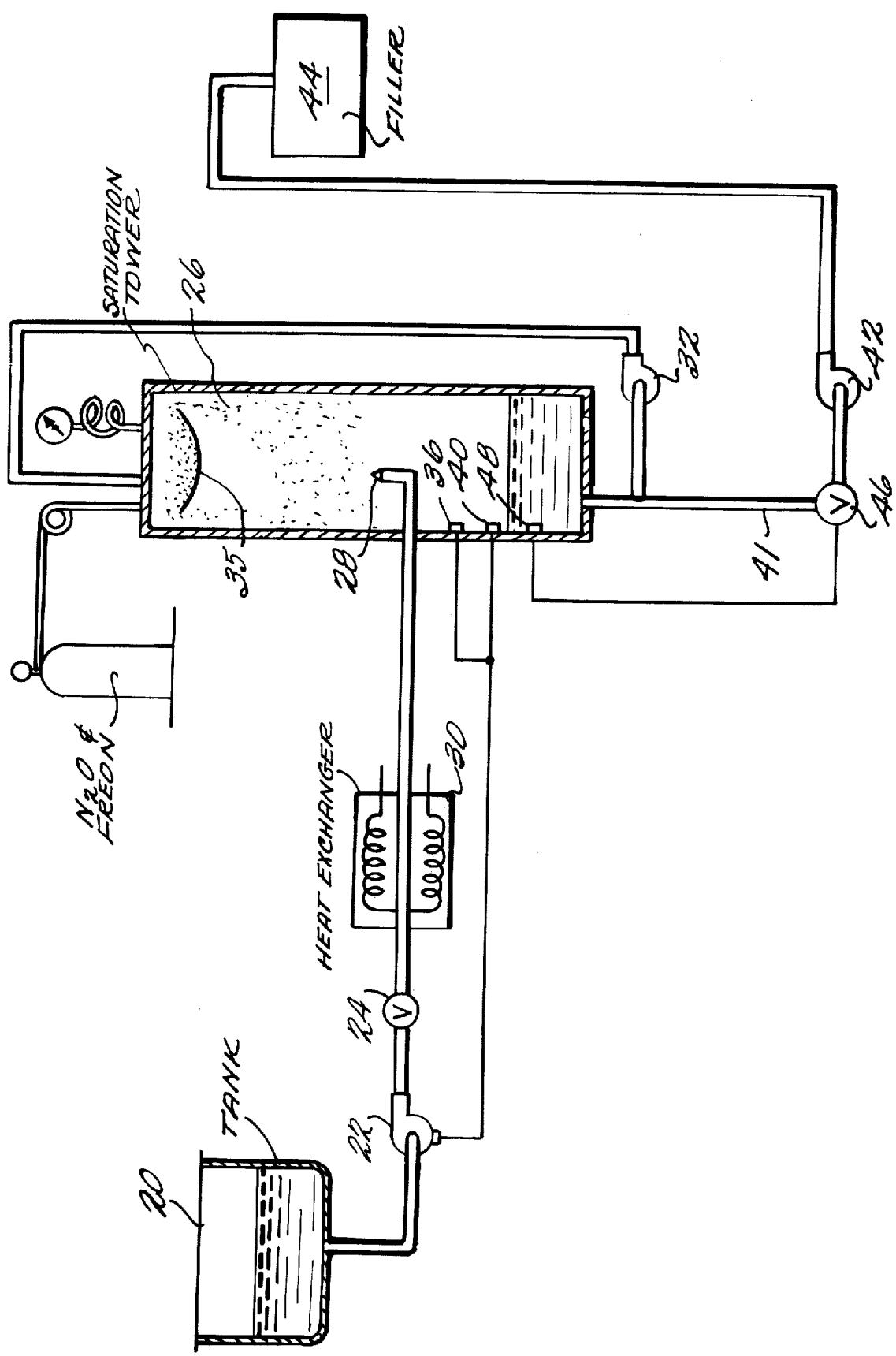

METHOD AND SYSTEM FOR PRODUCING A SOFT FOOD PRODUCT

BRIEF DESCRIPTION OF THE PRIOR ART AND SUMMARY OF INVENTION

The invention relates to a novel method and apparatus for producing a soft food mixture, such as soft ice cream.

Vast quantities of soft ice cream and similar products are consumed each year in the United States. Soft ice cream is a product which is similar in its constituents to normal ice cream but which is produced in a fashion such that the product has a much softer consistency than that of normal ice cream. This product has been but is not usually mixed with nitrous oxide ($N_2O$) and/or Freon and dispensed from a cooled cylinder directly into the cone or cup in which it is sold.

One technique employed in the past for adding nitrous oxide to a food mix involves injecting the nitrous oxide into a moving mix stream. The difficulty with this technique is that the nitrous oxide may not be uniformly and completely mixed with the material. There are simply too many variables for this technique to be completely satisfactory.

The present invention relates to a unique apparatus and method whereby a food mix, for example, the constituents making up soft ice cream, is atomized and injected into a saturation tower. A source of nitrous oxide and a food grade fluorocarbon such as Freon (Trademark) above atmospheric pressure is also coupled to the tower so that the atomized mix is completely and uniformly combined with the gases. The more nitrous oxide which goes into solution, the better the consistency of the product. In order to make sure that the final product has uniform consistency, the mix which settles to the bottom of the tower, which is combined with the gases, is continuously pumped to a location at the top of the tower where it is injected against a barrier plate to form particles which fall through the nitrous oxide and fluorocarbon gases to resettle on the bottom. At the same time, the mix is drawn off the bottom of the tower and pumped to a conventional filler device. Recirculating the mix produces a much more uniform composition than would be otherwise produced.

Preferably sensors are provided in the tower for controlling the pump which supplies mix to the tower to maintain the level of saturated mix in the tower within predetermined limits. This is desirable to maintain the pressure in the tower within a relatively constant range. A heat exchanger is also preferably included between the pump and the atomizer for removing any heat added to the mixture by the pump. Such heat is generally deleterious to the solubility of the gases in the mix. A further sensor is also provided for sensing when the mixture in the tower drops below a predetermined level and coupled to a valve between the output line and the pump which delivers the saturated fluid to the conventional filler to cut off delivery when the sensed level falls below a predetermined level.

Many other aspects of the invention will be clear from the following detailed description of the drawings.

BRIEF DESCRIPTION OF THE DRAWINGS

The FIGURE shows a schematic view of the unique system and method of this invention.

DETAILED DESCRIPTION OF THE DRAWINGS

Reference is now made to the FIGURE which schematically illustrates one embodiment of the unique apparatus and method of this application. A food product such as a soft ice cream mix, yogurt, or other similar material, is pumped from a storage tank 20 by a conventional pump 22 through check valve 24 and injected into saturation tower 26 via conventional atomizing nozzle 28. A conventional heat exchanger 30 is disposed between nozzle 28 and pump 22 for removing any heat added to the mixture by pump 22.

A mixture of nitrous oxide ($N_2O$) and a food grade fluorocarbon such as Freon (Trademark) gas are similarly added to the cooling tower adjacent the top thereto at a pressure above atmospheric so that the atomized particles are mixed the $N_2O$ and Freon as they fall to the bottom of the cooling tower and collect. The collected mixture in the bottom of tower 26 is recirculated by pump 32 and injected into tower 26 at the top thereof to impinge upon a baffle plate or barrier 35 to form particles which fall again to the bottom of tower 26. Recirculation of the fluid has been found to produce a much more uniform mix than the mix produced without such recirculation. A heat exchanger may also be desirable between pump 32 and the point of re-entry into tower 26.

Conventional sensors 36 and 40 are disposed near the desired level of saturated mix in tower 26 and provide suitable electrical signals for controlling pump 22 so as to control the amount of injected mix to maintain that level. It has been found that any variation from that level substantially changes the pressure within tower 26 which leads to undesirable changes in the consistency of the final product.

The saturated mix in tower 26 is drawn off at output line 41 by pump 42 and transferred to a conventional filler 44 which fills pressurized cans in a conventional manner. Filler 44 preferably includes an individual pressure control valve for each of the lines and a pressure gauge for monitoring the pressure at the filler. A heat exchanger may be desirable in the line between pump 42 and filler 44. Valve 46 is disposed between outlet line 41 and pump 42 and is controlled by a further conventional sensor 48 which provides an output signal closing valve 46 and stopping pump 42 whenever the level of saturated mix in saturation tower 26 drops below a desired level.

Many changes and modifications in the above described embodiment of the invention can, of course, be carried out without departing from the scope thereof. Accordingly that scope is intended to be limited only by the scope of the appended claims.

What is claimed is:

1. A system for producing a liquid soft food mix combined with a gas mixture comprising:
   a saturation tower,
   source means for said liquid soft food mix,
   source delivery means connecting said source means to said tower for delivering said mix,
   injection means connected to said delivering means for atomizing the delivered mix and injecting the atomized particles into said tower,
   means for supplying said gas mixture to said tower at a pressure above atmospheric pressure,
   filler means for filling containers with the food mix combined with gas mixture, filler delivery means connecting said filler means to said tower for delivering liquid mix in the bottom of said tower to said filler means, and recirculating means for withdrawing mix in the bottom of said tower and injecting the withdrawn mix back into said tower.

2. A system as in claim 1 wherein said injection means injects the mix into said tower so that the atomized particles fall through the gasses to the bottom of the tower.

3. A system as in claim 1 wherein said gas supplying includes a container of pressurized Freon and $N_2O$.

4. A system as in claim 1 wherein said source means is a tank of soft ice cream mix.

5. A system as in claim 1 wherein said recirculating means includes a pump, means coupling said pump between the said tower at a location below the normal level of mix in said tower and a location above the normal level of mix in the tower so that said pump transfers mix in the bottom of said tower to above the level of said mix which falls back to the bottom of said tower.

6. A system as in claim 5 wherein said recirculating means further includes a barrier in said tower adjacent where said mix enters said tower from said pump so that the mix impinges on said barrier.

7. A system as in claim 1 wherein said delivering means includes pump means connected between said filler means and said tower.

8. A system as in claim 7 wherein said filler delivering means further includes sensor means disposed in said tower for producing an electrical control signal as a function of the level of mix in the bottom of said tower and valve means connected in series with said pump means for controlling the rate of delivery of mix from said tower as a function of said control signal.

9. A system as in claim 8 wherein said control signal is produced when said level falls below a given level and said valve means prevents delivery when said control signal is being produced.

10. A system as in claim 8 wherein said control signal is produced when said level falls below a given level and said valve means prevents delivery when said control signal is being produced.

11. A system as in claim 1 wherein said source delivery means includes pump means and a heat exchanger disposed between said pump means and said injection means for removing heat added to said mix by said pump means.

12. A system as in claim 11 further including sensor means disposed in said tower for producing an electrical control signal which varies as a function of the level of mix in the bottom of said tower and means for controlling said pump means in accordance with said signal to maintain the level of mix in the bottom of said tower within predetermined limits.

13. A system as in claim 1 further including said mix.

14. A method of producing a soft food mix combined with a gas mixture comprising:

delivering said mix from source means for said food mix to a saturation tower, atomizing the delivered mix and injecting the atomized particles into said tower, supplying said gas mixture to said tower at a pressure above atmospheric pressure, filling containers with the food mix combined with gas mixture, and maintaining the level of mix in the bottom of said tower between predetermined limits.

15. A method as in claim 14 including the further step of recirculating the mix which collects in the bottom of said tank while said mix is being withdrawn to fill said containers.

16. A method as in claim 15 including the steps of delivering the mixture to said tower from a tank and controlling the rate of delivery to maintain the level in the bottom of said tower within a predetermined range.

17. A method as in claim 16 including the step of controlling the rate of withdrawal of mix from the bottom of said tower to prevent the level in the bottom from falling below a predetermined level.

18. A method of combining a soft food mix with gases comprising the steps of:

injecting an atomized stream of mix particles into a saturation tower, supplying said gases to said tower at a pressure above atmospheric pressure so that the injected particles fall through said gases and collect in the bottom of said tower, withdrawing mix collected in the bottom of said tower, and injecting part of the withdrawn mix back into said tower.

19. A method as in claim 18 including the further step of recirculating the mix which collects in the bottom of said tank while said mix is being withdrawn.

20. A method as in claim 18 including the steps of delivering the mixture to said tower from a tnak and controlling the rate of delivery to maintain the level in the bottom of said tower within a predetermined range.

21. A method as in claim 18 including the step of controlling the rate of withdrawal of mix from the bottom of said tower to prevent the level in the bottom from falling below a predetermined level.

22. A system for producing a liquid soft food mix combined with a gas mixture comprising:

a saturation tower, source means for said liquid soft food mix, source delivery means connecting said source means to said saturation tower for delivering said mix, injection means connected to said delivering means for atomizing the delivered mix and injecting the atomized particles into said tower, means for supplying said gas mixture to said tower at a pressure above atmospheric pressure, filler means for filling containers with the liquid food mix combined with gas mixture, filler delivery means connecting said filler means to said tower for delivering liquid mix in the bottom of said tower to said filler means, and means for maintaining the level of mix in the bottom of said tower between predetermined limits.

23. A system as in claim 22 wherein said controlling means further includes sensor means disposed in said tower for producing an electrical control signal as a function of the level of mix in the bottom of said tower and valve means connected in series with said pump means for controlling the rate of delivery of mix from said tower as a function of said control signal.

24. A system as in claim 22 wherein said source delivery means includes pump means and a heat exchanger disposed between said pump means and said injection means for removing heat added to said mix by said pump means.

25. A system as in claim 24 further including sensor means disposed in said tower for producing an electrical control signal which varies as a function of the level of mix in the bottom of said tower and means for controlling said pump means in accordance with said signal to maintain the level of mix in the bottom of said tower within predetermined limits.

26. A system as in claim 22 further including means for recirculating the mix in the bottom of said tower.

* * * * *